United States Patent
Lau

(10) Patent No.: US 9,588,548 B2
(45) Date of Patent: Mar. 7, 2017

(54) DOCKING STATION FOR A PORTABLE ELECTRONIC DEVICE

(71) Applicant: Kensonix Limited, Kowloon Bay (HK)

(72) Inventor: Chi Fai Lau, Kowloon Bay (HK)

(73) Assignee: KENSONIX LIMITED, Kowloon Bay (HK)

(*) Notice: Subject to any disclaimer, the term of this patent is extended or adjusted under 35 U.S.C. 154(b) by 0 days.

(21) Appl. No.: 14/986,090

(22) Filed: Dec. 31, 2015

(65) Prior Publication Data

US 2016/0195898 A1    Jul. 7, 2016

(30) Foreign Application Priority Data

Jan. 2, 2015 (GB) .................................. 1500014.4

(51) Int. Cl.
| | |
|---|---|
| H05K 5/00 | (2006.01) |
| H05K 7/00 | (2006.01) |
| G06F 1/16 | (2006.01) |
| H04M 1/04 | (2006.01) |
| H02J 7/00 | (2006.01) |

(52) U.S. Cl.
CPC .......... G06F 1/1632 (2013.01); H02J 7/0044 (2013.01); H04M 1/04 (2013.01)

(58) Field of Classification Search
CPC .................................. G02B 7/04; G10K 11/00
USPC ........................................ 361/679.01–679.21
See application file for complete search history.

(56) References Cited

U.S. PATENT DOCUMENTS

| | | | |
|---|---|---|---|
| 8,320,597 B2* | 11/2012 | Griffin, Jr. ........... | H04R 1/2857 181/179 |
| 8,483,420 B2 | 7/2013 | Kim et al. | |
| 9,100,751 B2 | 8/2015 | Kim et al. | |
| 2012/0140970 A1 | 6/2012 | Kim et al. | |
| 2013/0279731 A1 | 10/2013 | Kim et al. | |

FOREIGN PATENT DOCUMENTS

| | | |
|---|---|---|
| DE | 202012002007 U1 | 4/2012 |
| EP | 2464140 A2 | 6/2012 |
| GB | 2490369 A | 10/2012 |
| GB | 2511106 A | 8/2014 |

OTHER PUBLICATIONS

GB Combined Search and Examination Report, Jun. 23, 2015, 5 pages.

* cited by examiner

*Primary Examiner* — Jerry Wu

(74) *Attorney, Agent, or Firm* — Nyemaster Goode, P.C.

(57) ABSTRACT

A docking station for a portable electronic device that includes a base having a lower surface arranged to lie on a support surface in use, an upper surface and an aperture communicating between the lower and upper surfaces; an annular pedestal having a lower end engageable with the aperture in the base and an upper end including a support for a device-engaging terminal of a cable, arranged so that a cable received in the channel may extend through the aperture and annular pedestal with the terminal secured to have its connector extend upwardly from the pedestal; a support extending upwardly from the base, the support being moveable between locations in adjustable spaced relation rearwardly of the pedestal; and a clamp for securing the support in a said location.

15 Claims, 7 Drawing Sheets

DOCKING STATION FOR A PORTABLE ELECTRONIC DEVICE

CROSS-REFERENCE TO RELATED APPLICATION

This application claims priority to United Kingdom 1500014.4, filed on Jan. 2, 2015, entitled "Docking Station for a Portable Electronic Device," the disclosure of which is hereby incorporated herein by reference in its entirety.

SUMMARY

This disclosure generally relates to a docking station for a portable electronic device such as a mobile phone or tablet, and arranged so that the device may be releasably mounted in an upright orientation on a stand or pedestal and engaged to a charging or data connection cable having a connector configured for use with the specific device. Mobile phones or tablets have differently configured sockets for their charging or data connecting cables. Dedicated docking stations can only be used with one specific device or a narrow arrangement of devices so that a user may need to replace the docking station when upgrading to a new phone for example.

One aspect of the present disclosure is generally directed to a docking station for a portable electronic device that includes a base having a lower surface arranged to lie on a support surface in use, an upper surface and an aperture communicating between the lower and upper surfaces where the lower surface has one or more channels communicating with the aperture, the channels being dimensioned to receive and engage a connector cable for the device; an annular pedestal having a lower end engageable with the aperture in the base and an upper end including a terminal support for a device-engaging terminal of a cable, arranged so that a cable received in the channel may extend through the aperture and annular pedestal with the terminal secured to have its connector extend upwardly from the pedestal; a moveable support extending upwardly from the base, the moveable support being moveable between locations rearwardly of the pedestal; and a clamp for securing the moveable support in a said location.

The upper end of the pedestal includes a terminal support configured to support the portable electronic device mounted on the docking station. The upper surface of the pedestal may form a support surface on which the device may rest. Alternatively, the terminal may be supported by the terminal support so that the device is held securely by the terminal when docked. The terminal support and moveable support cooperate in use to securely support the device preventing movement when docked, so that a user may safely actuate the device e.g. by pressing the screen.

In a preferred embodiment the pedestal may be configured to receive a number of differently shaped or sized cable terminals to allow the docking station to be used with a plurality of different mobile devices. The pedestal may include a casing formed from forward and rear shell portions, a holder comprising forward and rear holder portions and a cap configured to be inserted onto the casing to secure the shell portions and holder.

In preferred embodiments, the holder is configured to be located within the casing in one of two opposed orientations. The orientations may be opposed by 180°, that is the holder may be inserted in a first location or rotated through 180° and inserted in a second orientation. The holder may be annular, having a first cavity at one end adapted to receive a first cable terminal and having a second cavity at the second end adapted when the holder is inverted to receive a second differently dimensioned cable terminal.

The moveable support may include a plate-like support member providing a forwardly facing support surface, and having a foot arranged to engage the upper surface of the base and one or more flanges arranged to extend through slots in the base to allow the moveable support to slide forwardly or rearwardly relative to the pedestal, so that the support surface can contact the rear surface of a phone, tablet or other electronic device when the latter is engaged to the connector of the connector cable located in the pedestal. This arrangement prevents the device from being pushed rearwardly causing damage to the terminal and/or connector. The arrangement also facilitates correct orientation of the device as it is engaged with the docking station preventing damage to the terminal and/or connector during such engagement.

The pedestal and moveable support are preferably arranged in parallel, either extending vertically from the base or more preferably at an angle of 20° to 30° to the vertical.

Another aspect of the present disclosure includes a kit for assembly to form a docking station for a portable electronic device that includes: a base having a lower surface arranged to lie on a support surface in use, an upper surface and an aperture communicating between the lower and upper surfaces where the lower surface has one or more channels communicating with the aperture, the channels being dimensioned to receive and engage a connector cable for the device; an annular pedestal having a lower end engageable in use with the aperture in the base and an upper end including a support for a device-engaging terminal of a cable, arranged so that a cable received in the channel may extend through the aperture and annular pedestal with the terminal secured to have its connector extend upwardly from the pedestal; a moveable support member arranged to extend upwardly from the base, so that it is moveable between locations rearwardly of the pedestal; and a clamp for securing the moveable support in a said location.

A docking station in accordance with this disclosure has the advantage that it may be assembled, dismantled and reassembled from the kit to accommodate any of a plurality of commonly used cables without the need for tools or screws. The front and rear shell portions, when assembled, form an annular casing having inwardly extending projections arranged to engage the holder in a first configuration where the holder is annular and arranged to engage a cable terminal or to directly engage a cable terminal without use of the holder.

The pedestal may have limited forward and rearward pivotal movement when engaged in the aperture. A resilient member may be arranged to urge the pedestal to a rearward position. The resilient member may be an elastomeric pad or spring means located in the base adjacent the aperture. Alternatively, a resilient member may be integral with the lower end of the pedestal.

The resilient member is preferably arranged to urge the pedestal to a rearward position. Movement of the pedestal forwardly as an electronic device is attached to the connector is accommodated, preventing an excessive force being applied to the terminal and/or connector as the electronic device is engaged or disengaged.

The annular body of the holder, when used, may be configured to receive and engage a cable terminal, for example, an APPLE® Lightning USB cable, a Micro USB or other Lightning cable terminal. Alternatively, the holder may be omitted so that a Micro USB 3.0 cable terminal may be directly engaged between the shell portions and securely held for use in mounting an electronic device.

The interior of one or both shell portions may have an array of radially extending equally spaced projections, for example, ribs or lugs arranged to engage correspondingly shaped equally spaced projections on the outer surface of the holder. The projections preferably include an array of equally spaced parallel ribs, outwardly extending from the holder and inwardly extending from the shell portion so that when the shell portions are pressed together, the holder may be engaged within the casing in any of a plurality of locations along the axis of the pedestal. This arrangement allows the cable to be located securely with the connector extending upwardly from the upper surface of the pedestal.

The holder may be inserted into the shell in one of two opposed orientations by rotation through 180° prior to insertion of the cable and assembly of the holder half portions.

The casing including the shells and cap together with the holder form an upwardly extending mounting arrangement. This may be configured so that any of the commonly available connecting cables may be secured with the connector extending from the annular pedestal to receive an electronic device such as a mobile phone with the device body resting on the pedestal and the back of the device supported against the upright support.

The lower part of the rearward shell may be configured to be received in the aperture in the base in a first orientation then moved to a second orientation to lock the shell part into the base in a forward facing orientation to receive the cable holder and the forward shell portion. Insertion of the cap onto the two shell portions secures the latter together to form a fully assembled pedestal without use of screws or other fastenings.

The base may have a plurality of cable channels extending from an edge of the base, typically at the rear, to the aperture, each channel having portions with a width selected to receive and engage commonly used thicknesses of cable, for example from 2.6 mm to 4.0 mm.

The underside of the base may be provided with a locking clamp to hold the foot, preventing movement of the support. An overcenter locking clamp arrangement may be employed.

The present disclosure affords the advantage that a secure support for a mobile phone, tablet or other portable electronic device is provided. A kit of parts may be provided to allow assembly without the need for screws or tools to accommodate a range of commonly available devices.

BRIEF DESCRIPTION OF THE DRAWINGS

The disclosure and claimed invention is further described by means of example, but not in any limitative sense, with reference to the accompanying drawings, of which:

DETAILED DESCRIPTION

Figure 1:
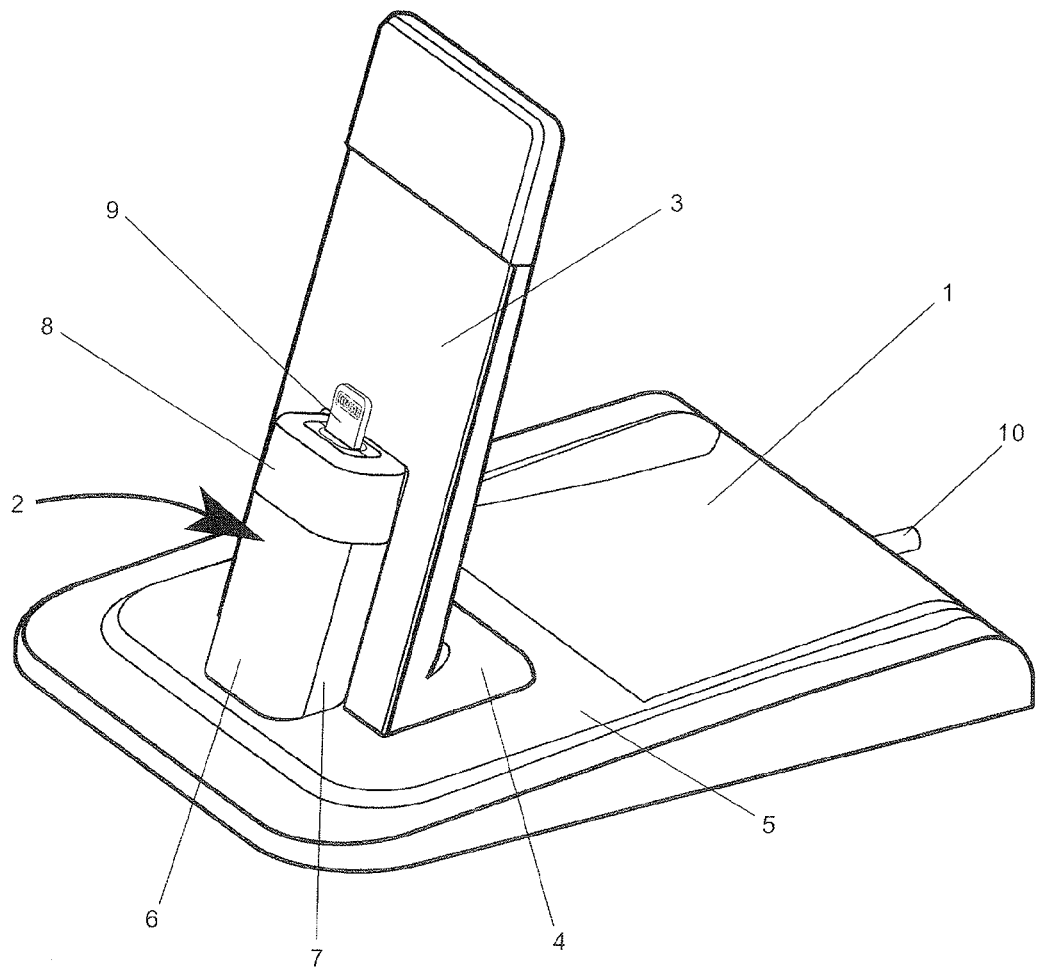
FIG. 1 is a perspective view of a docking station in accordance with an aspect of this disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 is a perspective view of the docking station including a base 1, a pedestal 2 extending upwardly from the base and a support member 3 having a foot 4 which engages an upper surface 5 of the base 1.

The pedestal typically includes front 6 and rear 7 shell portions and an annular cap 8. The connector 9 of a connector cable 10 extends upwardly from the pedestal 2 parallel to the support 3 so that a mobile device such as a phone or tablet may be mounted upon the connector 9 with the back surface supported by the support 3. The support 3 is inclined rearwardly of the vertical by an angle between 10° and 20°.

The upper end of the pedestal 2 typically includes a terminal support configured to support the portable electronic device mounted on the docking station. The upper surface of the pedestal 2 may form a support surface on which the device may rest. Alternatively the terminal may be supported by the terminal support so that the device is held securely by the terminal when docked. The terminal at final support and moveable support 3 cooperate in use to securely support the device, preventing movement when docked so that a user may safely actuate the device e.g. by pressing the screen.

Figure 2:
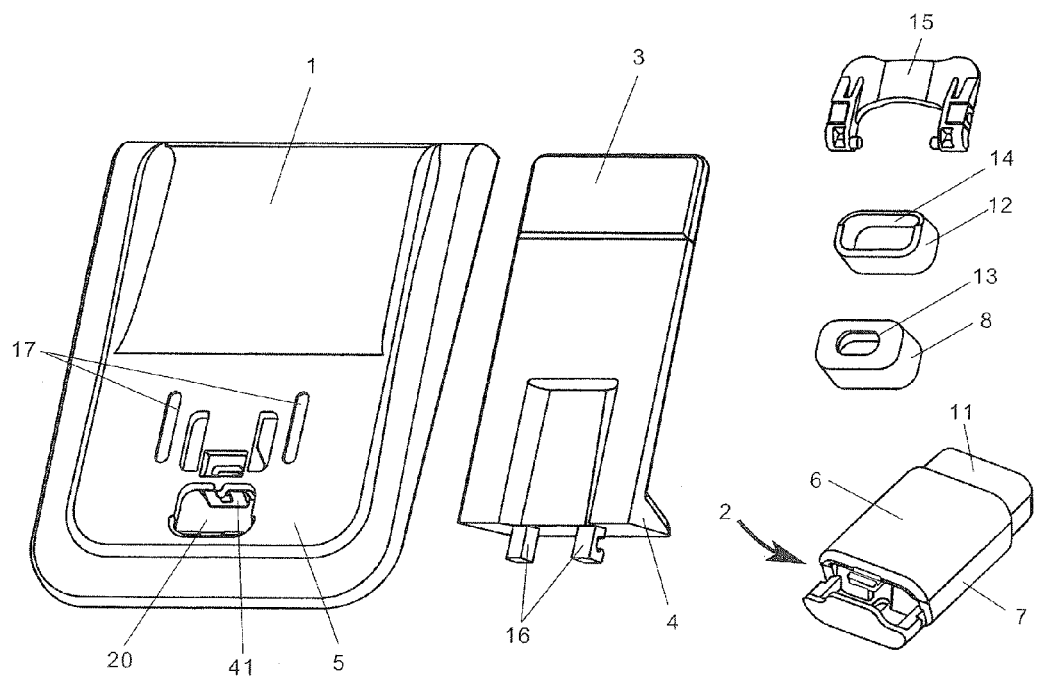
FIG. 2 shows components of a kit for assembly to form the docking station.

FIG. 2 shows a kit of parts from which the docking station may be assembled. The front 6 and rear 7 shell portions form an annular collar 11 onto which one of a plurality of caps 8, 12 may be inserted. The caps 8, 12 have differently sized apertures 13, 14 to receive differently sized cable terminals, as described below with reference to FIGS. 13 to 15.

The foot 4 has a pair of downwardly extending flanges 16, which may be plate-like and slidably received in slot 17 in the base 1 permitting the foot and support to be positioned at a suitable distance behind the pedestal to engage the rear of a device mounted on the pedestal in use. The location of the support is adjustable by sliding movement of the flanges 16 in the slot 17.

A clamp 15 is received in the lower surface of the base, to clamp the flanges when actuated, preventing sliding movement of the support at any desired location.

Figure 3:
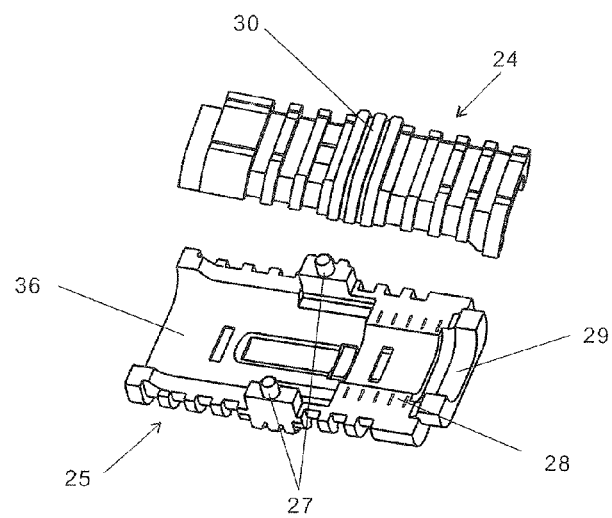
FIG. 3 shows the holder.
Figure 13:
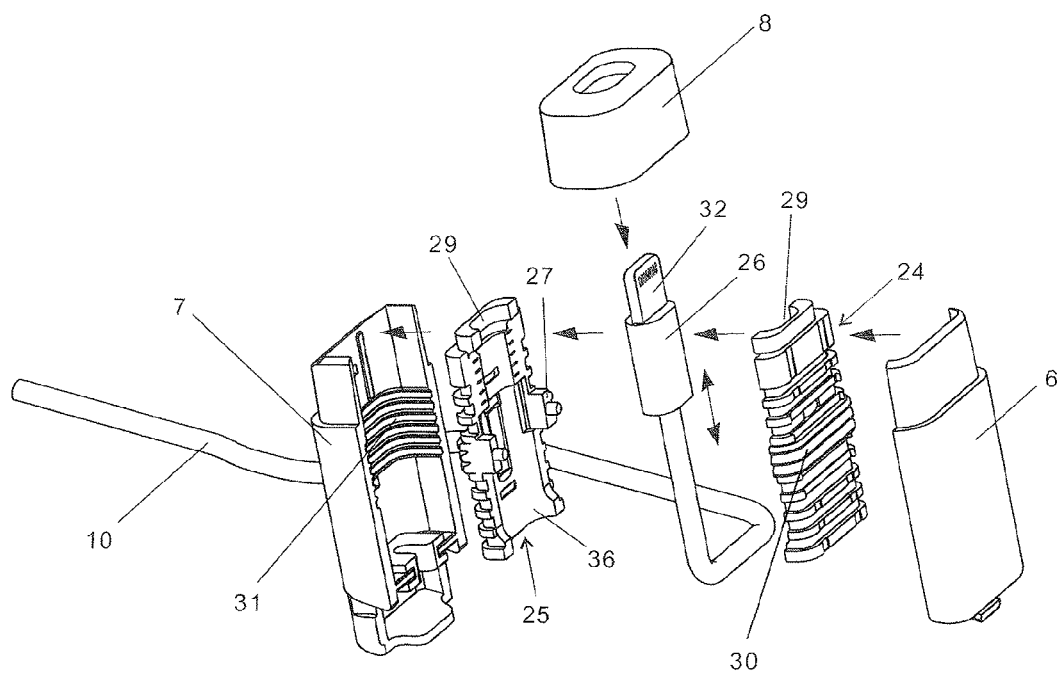
FIGS. 13 to 15 each illustrate an exploded perspective view of the assembly with various cables.

FIG. 3 shows the two front 24 and rear 25 holder portions to have lugs 27 and corresponding sockets that engage to form an annular holder for a cable terminal as shown in FIG. 13. The interior surfaces of the upper outlet end 28 have inwardly extending deformable projections arranged to form an aperture 29 dimensioned to receive a cable terminal 26.

In use, the pedestal 2 is mounted in aperture 20 in the base 1. The pedestal has a lower end dimensioned to be received in the aperture permitting a limited degree of forward and rearward pivotal motion. This rocking movement serves to prevent excessive force being applied to the terminal 26 and/or connector 32 during engagement or removal of a portable device. The risk of damage to the terminal is therefore reduced.

A resilient means that includes a pad 41 is located rearwardly of the aperture 20 to serve as a cushion which is compressed as the pedestal moves forwardly from a rest position in order to provide a restoring force to urge the pedestal into the rest position after engagement or disengagement of a mobile device. The resilient pad 41 may be composed of elastomeric material. Alternatively, a spring may be employed.

In FIG. 13, the cable is an APPLE® Lightning USB cable. When the two front and rear holder portions are assembled around the cable terminal 26, the holder engages the terminal, holding the terminal securely to allow engagement with a mobile electronic device.

The outer surface of the holder has an array of outwardly extending ribs 30, which may be received and engaged at a number of locations between inwardly extending ribs 31 in the interior of the shell portions 6, 7 to securely locate the holder and cable terminal at a selected height in the pedestal so that the connector 32 extends through the cap 8 to allow engagement of the electronic device.

Figure 4:
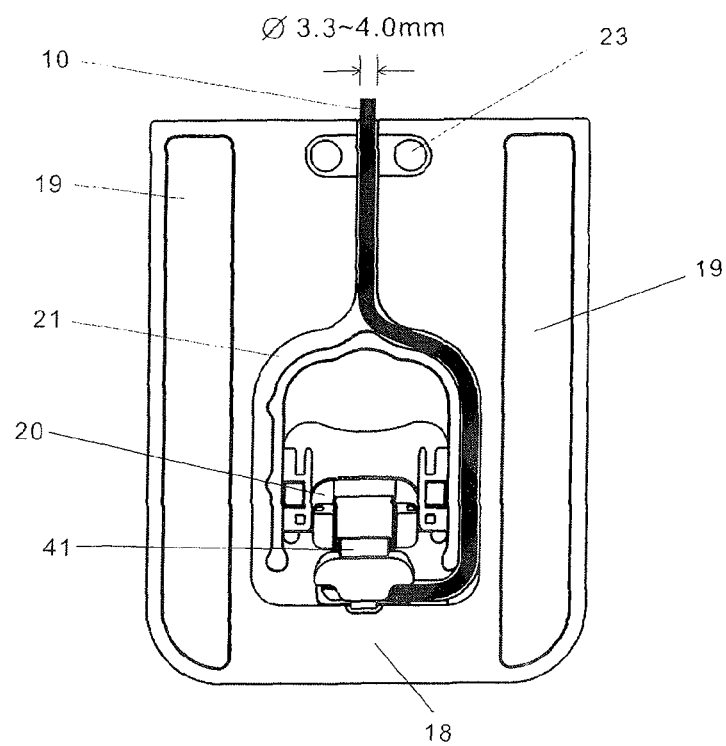
FIGS. 4 and 5 are views from the underside of the base showing alternative cable channels.
Figure 5:
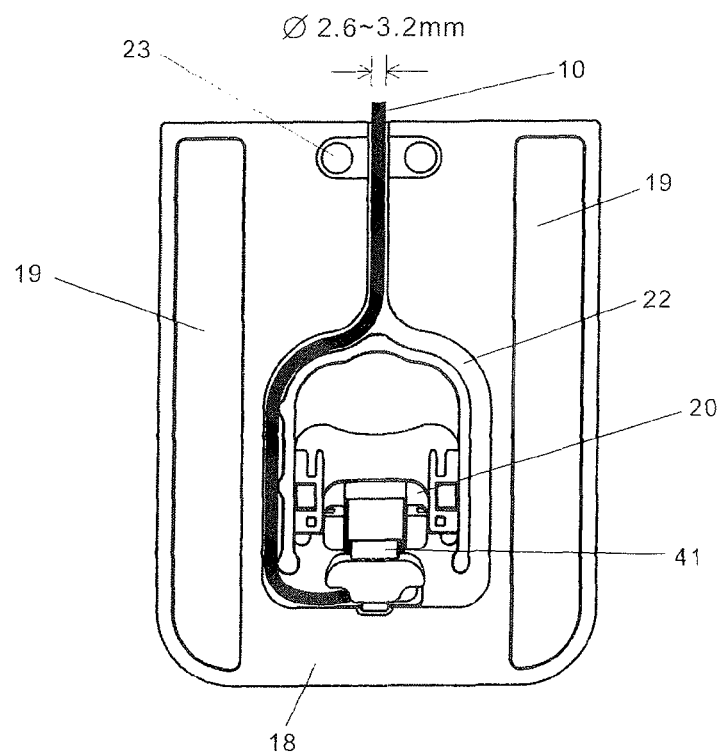

FIGS. 4 and 5 show the lower surface of the base having pads 19 arranged to engage the surface of a desk or other supporting surface.

Figure 14:
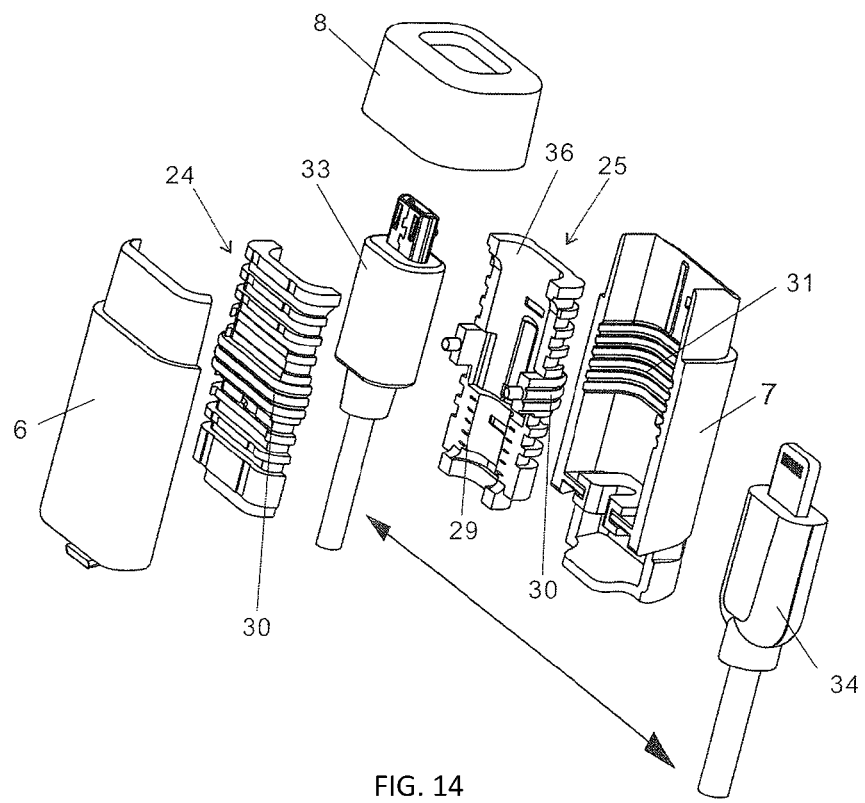

FIG. 14 shows the arrangement for engagement of a MicroUSB cable terminal 33 or a third party Lighting cable terminal 34. In this arrangement, the holder portions 24, 25 are inverted so that a larger annular cavity 36 is located upwardly to receive the terminal 33, 34. The location of the holder within the shell portions may adjusted in the same way as described in relation to FIG. 13, by engagement of the ribs within the corresponding ribs 31 of the interior of the shell portions. The cap 8 is then inserted onto the top of the shell portions to secure the arrangement for use.

Figure 15:
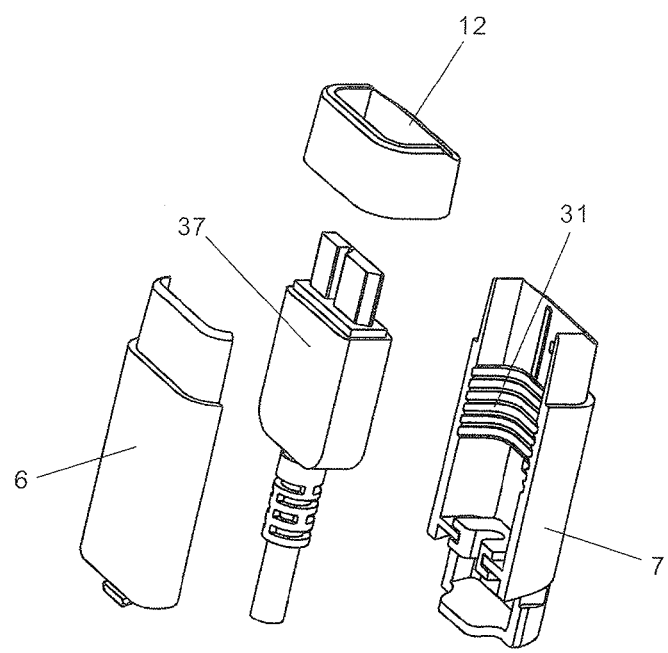

FIG. 15 shows a further embodiment for use with a Micro USB 3.0 cable 37. In this arrangement the holder 24, 25 is omitted but the inwardly extending ribs 31 are configured to engage the cable terminal 37 holding it securely as a second differently dimensioned cap 12 provided in the kit of parts is inserted onto the shell portions to form the assembled docking station.

Figures 6, 7, 8:
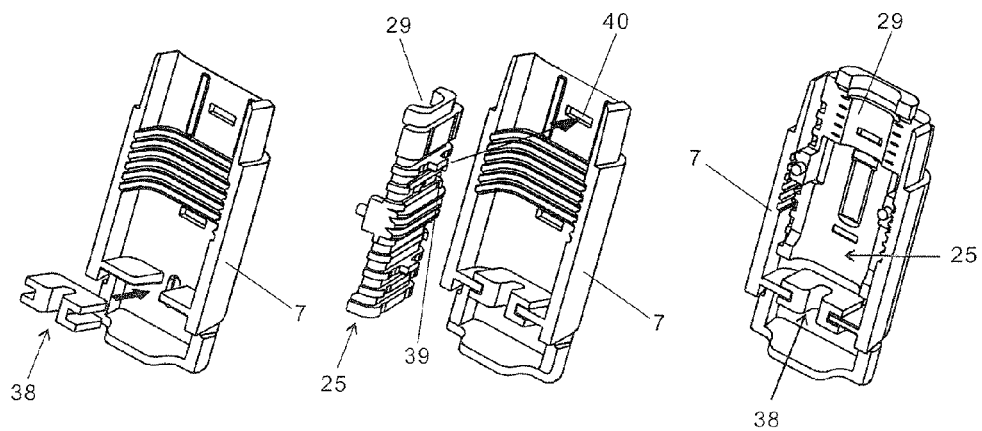
FIGS. 6 to 9 illustrate successive stages in assembly of the rearward shell and base.

FIGS. 6 to 12 illustrate the steps of assembly of the docking station. In FIG. 6 a cable holder 38 formed from resilient material is inserted into the rear shell portion 7 to provide a secure cable guideway.

In FIG. 7 the rear holder 25 is arranged with the appropriate aperture 29 or 36 located upwardly and inserted into engagement within the rear shell 7 at an appropriate height so that the outlet of the aperture extends beyond the shell portion as shown in FIG. 8. The ribs 30 extending outwardly of the holder are received between the corresponding inwardly extending ribs 31 of the shell 7. A projection 39 extending from the outer surface of the holder is engaged into a hole 40 in the inner surface of the shell.

Figures 9, 10:
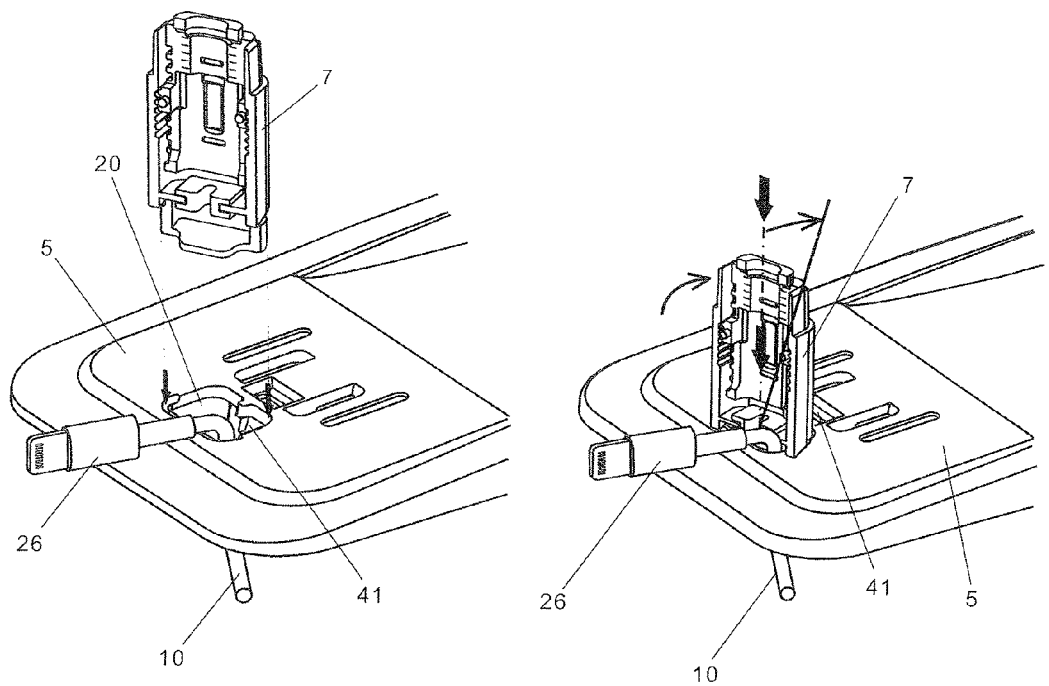
FIG. 10 shows locking of the rearward shell to the base.

FIG. 9 shows insertion of the cable 10 and terminal 26 through aperture 20, followed by the assembled rear shell portion 7, which is inserted diagonally into the aperture 20 in the base 5. The assembly is then rotated towards a vertical 90° orientation as shown in FIG. 10, followed by twisting so that the back of the shell is correctly oriented within the aperture so that the opening of the shell faces forwardly to receive the front shell portion 6. The rear shell portion is then inclined as shown in FIG. 11.

Figure 11:
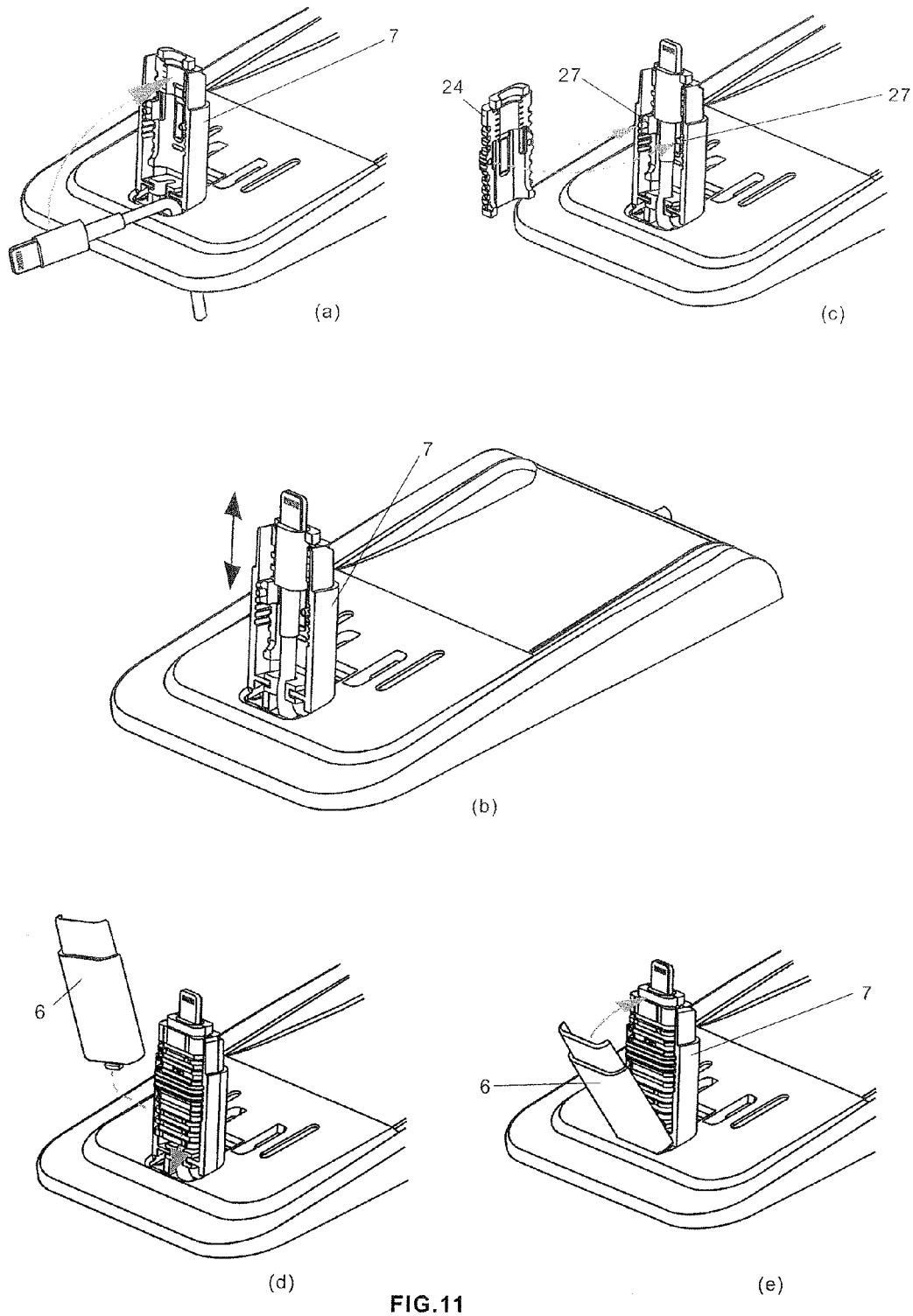
FIG. 11 shows stages of insertion of the forward shell portion.
Figure 12:
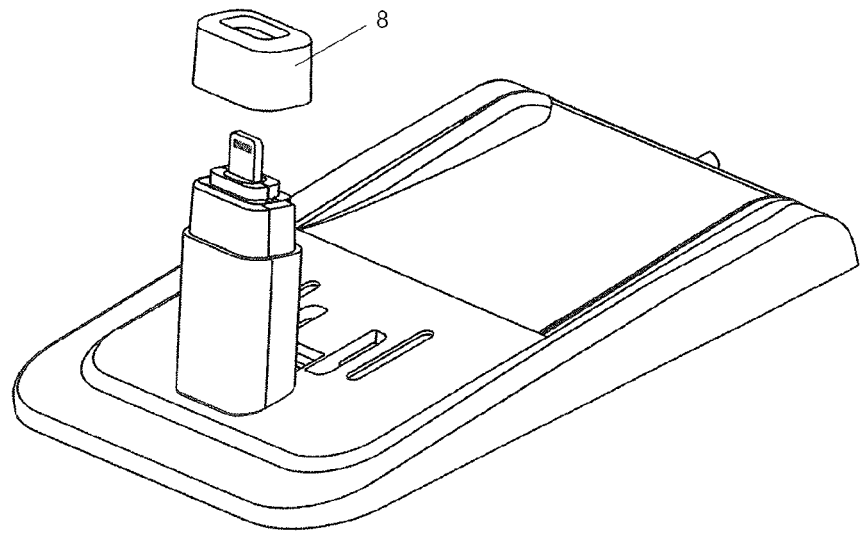
FIG. 12 shows insertion of the cap.

In FIG. 11 the cable is located in position and the front holder 24 is engaged to the lugs 27 of the rear holder 25 followed by insertion of the front shell portion 6 into the aperture 20. The cap 8 is then fitted as shown in FIG. 12. The charging or docking station is then ready for use. An advantage of the charging or docking station according to this invention is that it may be assembled, dismantled and reassembled without the need for screws or other fasteners.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A docking station for a portable electronic device comprising:
    a base having a lower surface arranged to lie on a support surface in use, an upper surface and an aperture communicating between the lower and upper surfaces;
    the lower surface having one or more channels communicating with the aperture, the channels being dimensioned to receive and engage a connector cable for the device;
    an annular pedestal having a lower end engageable with the aperture in the base and an upper end including a terminal support for a device-engaging terminal of the cable, arranged so that the cable received in the channel may extend through the aperture and the annular pedestal with the terminal secured to have its connector extend upwardly from the pedestal;
    a moveable support extending upwardly from the base, the moveable support being moveable between locations rearwardly of the pedestal; and
    a clamp for securing the moveable support in a said location; and
    a holder located within the pedestal having a first cavity adapted to receive a first cable terminal and a second cavity adapted to receive a second differently dimensioned cable terminal in different orientations.

2. The docking station of claim 1, wherein the pedestal is configured to receive a number of differently shaped or sized cable terminals.

3. The docking station of claim 1, wherein the pedestal comprises a casing formed from forward and rearward shell portions, the holder comprising forward and rear holder portions and a cap configured to be inserted onto the casing to secure the shell portions and holder.

4. The docking station of claim 2, wherein the pedestal comprises a casing formed from forward and rearward shell portions, a holder comprising forward and rear holder portions and a cap configured to be inserted onto the casing to secure the shell portions and holder.

5. The docking station of claim 3, wherein the holder is configured to be located within the casing in one of two opposed orientations.

6. The docking station of claim 4, wherein the holder is configured to be located within the casing in one of two opposed orientations.

7. The docking station of claim 6, wherein the holder is annular, having a first cavity at a first end adapted to receive a first cable terminal and having a second cavity at a second end adapted to receive a second differently dimensioned cable terminal.

8. The docking station of claim 1, wherein the moveable support comprises a support member having a foot arranged to engage the upper surface of the base and one or more flanges arranged to extend through slots in the base to allow the moveable support to slide forwardly or rearwardly relative to the pedestal.

9. The docking station of claim 2, wherein the moveable support comprises a support member having a foot arranged to engage the upper surface of the base and one or more flanges arranged to extend through slots in the base to allow the moveable support to slide forwardly or rearwardly relative to the pedestal.

10. The docking station of claim 3, wherein the moveable support comprises a support member having a foot arranged to engage the upper surface of the base and one or more flanges arranged to extend through slots in the base to allow the moveable support to slide forwardly or rearwardly relative to the pedestal.

11. The docking station of claim 5, wherein the moveable support comprises a support member having a foot arranged to engage the upper surface of the base and one or more flanges arranged to extend through slots in the base to allow the moveable support to slide forwardly or rearwardly relative to the pedestal.

12. The docking station of claim 1, wherein the pedestal is mounted for forward or rearward pivotal movement in the aperture.

13. The docking station of claim 12 further comprising a resilient member adjacent the aperture wherein the resilient member provides a restoring force to move the pedestal to a rest position.

14. The docking station of claim 13, wherein the resilient member is an elastomeric pad.

15. A kit for assembly to form a docking station for a portable electronic device comprising:
   a base having a lower surface arranged to lie on a support surface in use, an upper surface and an aperture communicating between the lower and upper surfaces;
   the lower surface having one or more channels communicating with the aperture, the channels being dimensioned to receive and engage a connector cable for the device;
   an annular pedestal having a lower end engageable in use with the aperture in the base and an upper end including a terminal support for a terminal of the cable, arranged so that the cable received in the channel may extend through the aperture and the annular pedestal with the terminal secured to have its connector extend upwardly from the pedestal;
   a moveable support arranged to extend upwardly from the base, so that it is moveable relative to the pedestal;
   the moveable support being located at a location behind the support; and
   a clamp for securing the moveable support in said location; and
   a holder located within the pedestal have a first cavity adapted to receive a first cable terminal and a second cavity adapted to receive a second differently dimensioned cable terminal in different orientations.

* * * * *